United States Patent [19]
Johnson et al.

[11] Patent Number: 5,354,364
[45] Date of Patent: Oct. 11, 1994

[54] HIGH EFFICIENCY ADVANCED DRY SCRUBBER

[75] Inventors: Dennis W. Johnson, Barberton; Robert B. Myers, Copley; George B. Watson, Alliance, all of Ohio

[73] Assignee: The Babcock & Wilcox Company, New Orleans, La.

[21] Appl. No.: 81,765

[22] Filed: Jun. 23, 1993

[51] Int. Cl.$^5$ .................. B01D 47/06; B01D 47/16
[52] U.S. Cl. .................. 95/197; 95/198; 95/204; 95/217; 95/227; 95/235; 55/222; 55/228; 55/259
[58] Field of Search .................. 55/222, 228, 230, 238, 55/251.1, 259, 260; 95/151, 187, 197, 198, 204, 205, 216, 217, 227, 235

[56] References Cited

U.S. PATENT DOCUMENTS

| | | | |
|---|---|---|---|
| 970,654 | 9/1910 | Sepulchre | 95/204 |
| 2,578,315 | 12/1951 | Parker | 95/216 X |
| 3,681,895 | 8/1972 | Zirngibl et al. | 85/204 X |
| 4,105,591 | 8/1978 | Banks et al. | 252/466 J |
| 4,250,060 | 2/1981 | Banks et al. | 252/466 J |
| 4,251,236 | 2/1981 | Fattinger et al. | 55/84 |
| 4,338,292 | 7/1982 | Duranleau | 423/656 |
| 4,375,425 | 3/1983 | Duranleau et al. | 252/467 |
| 4,417,905 | 11/1983 | Banks et al. | 48/214 A |
| 4,473,438 | 9/1984 | Loureiro | 55/257.1 X |
| 4,481,171 | 11/1984 | Baran et al. | 55/230 X |
| 4,530,822 | 7/1985 | Ashley et al. | 55/230 X |
| 4,584,000 | 4/1986 | Guest | 95/235 X |
| 4,600,561 | 7/1986 | Frei | 55/222 X |
| 4,616,574 | 10/1986 | Abrams et al. | 110/343 |
| 4,623,523 | 11/1986 | Abrams et al. | 423/242 |
| 4,652,295 | 3/1987 | Alfrey | 71/43 |
| 4,682,991 | 7/1987 | Grethe et al. | 55/238 X |
| 4,784,841 | 11/1988 | Hartmann et al. | 423/613 |
| 4,795,619 | 1/1989 | Lerner | 423/244 |
| 4,874,400 | 10/1989 | Jury | 55/230 X |
| 4,874,478 | 10/1989 | Ishak et al. | 204/16 |
| 4,888,158 | 12/1989 | Downs | 423/242 |
| 4,975,257 | 12/1990 | Lin | 423/244 |
| 4,986,838 | 1/1991 | Johnsgard | 55/238 X |
| 5,215,557 | 6/1993 | Johnson et al. | 55/230 X |

*Primary Examiner*—Robert Spitzer
*Attorney, Agent, or Firm*—Daniel S. Kalka; Robert J. Edwards

[57] ABSTRACT

An improved apparatus and method for spraying a liquid into a flue gas provides a boundary layer of gas along a perimeter of a dry scrubber housing to prevent deposition of wet material on the sidewalls thereof. The boundary layer of gas includes the use of heated air, particulate free flue gas, and/or dust laden flue gas. The system is operated at/or near the saturation temperature to further increase removal efficiencies and reagent utilization.

17 Claims, 7 Drawing Sheets

FIG. IA
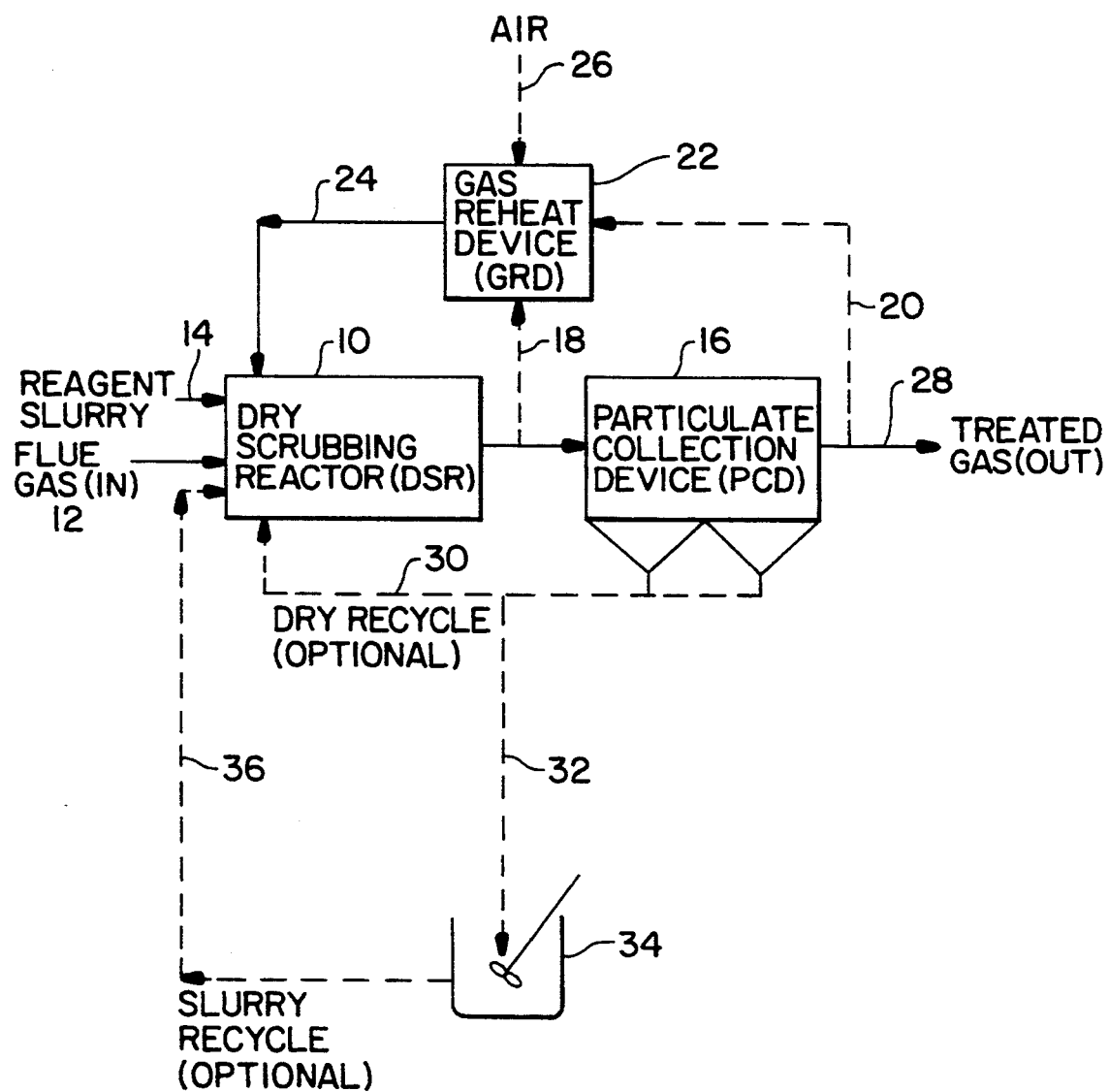

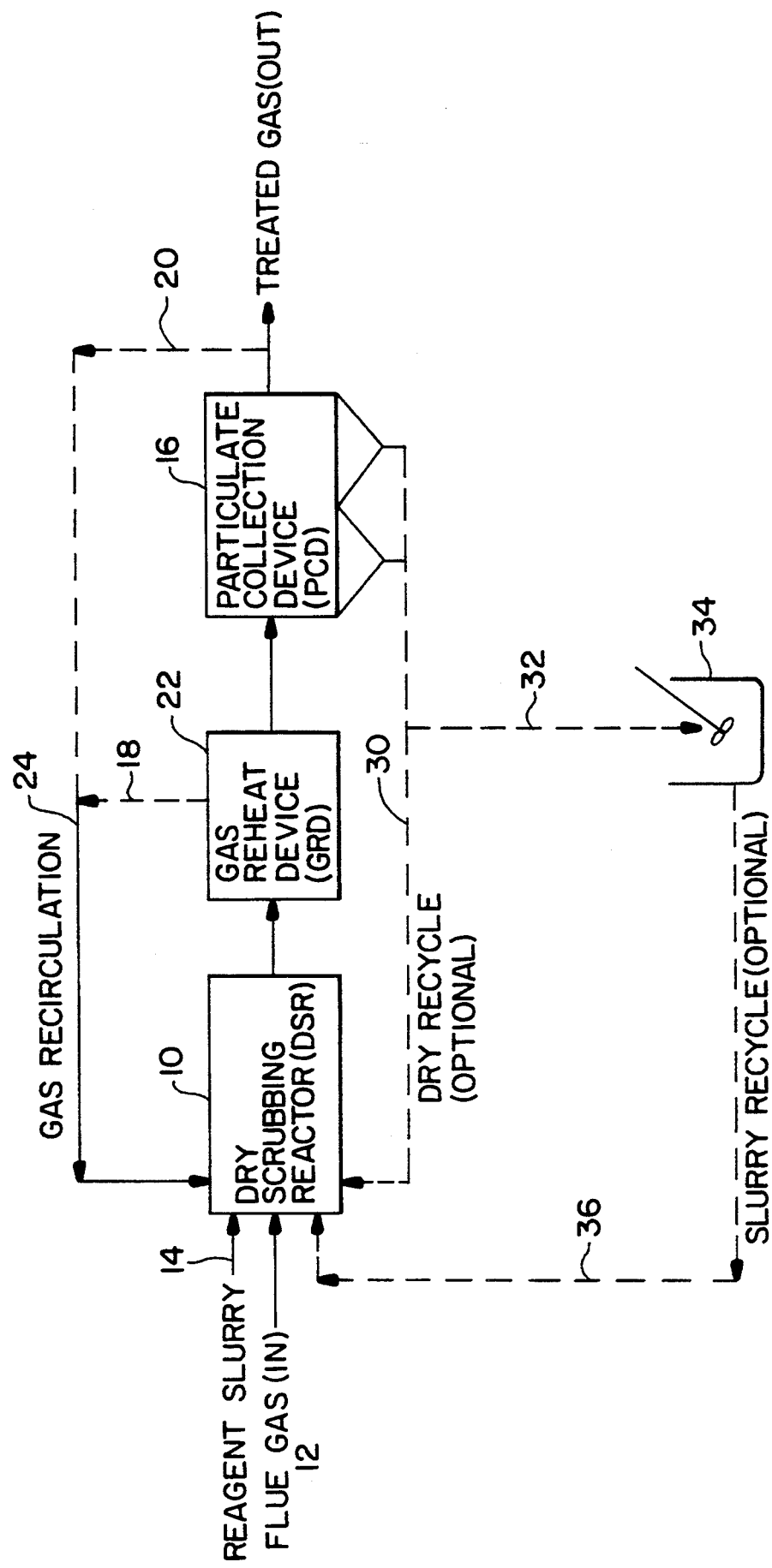

HIGH EFFICIENCY ADVANCED DRY SCRUBBER

BACKGROUND OF THE INVENTION

1. Field of the Invention

The present invention relates generally to the removal of sulfur oxides and other contaminants contained in a flue gas by spray drying or dry scrubbing. More particularly, it relates to an apparatus and method to advance the existing dry scrubbing technology by increasing both sulfur oxide and other contaminant removal efficiencies and reagent utilization to approach those achievable by wet scrubbing, i.e., by reducing spray down temperatures to at/or near saturation while still producing a dry product.

2. Description of the Related Art

The reduction of sulfur oxides and other contaminants contained in a flue gas formed during the combustion of coal/sulfur-bearing fossil fuels and waste materials is of the utmost concern to industry. These fuels are burned by electric power generating plants, waste recycling plants, and other industrial processes. There have been many attempts to comply with federal and state air pollution requirements which have included the following methods.

One attempt has been to locate and utilize fossil fuels lower in sulfur content and/or other contaminants. The major disadvantage with this approach is the increased fuel and freight cost due to supply and demand and/or proximity to the end user.

Another attempt is the reduction of the sulfur content and other contaminants in the fuel prior to combustion by way of mechanical and/or chemical processes. The major disadvantage with this approach is the cost effectiveness of the mechanical and/or chemical processing necessary to meet the required reduced levels of sulfur and/or other contaminants.

Another approach has been the injection of dry pulverized alkali directly into the hot combustion gases for removal of sulfur oxides and other contaminants by way of chemical adsorption or absorption followed by oxidation. The major disadvantages with this approach is the low to moderate removal efficiencies, poor reagent utilization, increased particulate loadings in the flue gas which necessitate the requirement for further flue gas conditioning (i.e., humidification or sulphur trioxide injection) when the injection process is conducted upstream of a collection device such as an electrostatic precipitator (ESP).

Still another approach has been spray drying chemical absorption processes, i.e., dry scrubbing, wherein an aqueous alkaline solution or slurry is atomized via a mechanical, dual fluid, or rotary type atomizer and sprayed into a hot flue gas stream to remove sulfur oxides and other contaminants. The major disadvantage with this approach is the limitation on spray down temperature, i.e., the approach to the flue gas saturation temperature, due to the economics associated with the materials of construction and operation of downstream equipment which in turn directly limits removal efficiencies and reagent utilization.

Yet another approach has been wet chemical absorption processes, i.e., wet scrubbing, wherein the hot flue gas is typically washed with an aqueous alkaline solution or slurry to remove the sulfur oxides and other contaminants. The major disadvantages with this approach are the loss of liquid both to the atmosphere due to the saturation of flue gas and mist carryover and the sludge produced in the process. Additionally, the economics are not favorable considering the materials of construction which include the absorber module and all related equipment downstream such as primary/secondary de-watering and waste water treatment subsystems.

U.S. Pat. No. 4,623,523 to Abrams et al discloses a confined zone dispersion technique using a boundary slip stream layer of untreated flue gas. However, this patent fails to teach the injection and control of a treated flue gas or heated air as a boundary layer with measures to actively control, modify and establish the boundary layer.

Thus, there is a need for a high efficiency advanced dry scrubber (HEADS) which advances the existing dry scrubbing technology so that the pollutant removal efficiencies are increased and reagent utilization optimized by reducing spray down temperatures to at/or near saturation similar to wet scrubbing yet producing a dry product.

SUMMARY OF THE INVENTION

The present invention solves the aforementioned problems with the prior art as well as others by providing a high efficiency advanced dry scrubber which employs a slip stream of dust laden flue gas or particulate free flue gas, or heated injected air to create a boundary layer on the walls of the dry scrubber reactor (DSR).

One object of the present invention is to provide an improved apparatus for spraying a liquid into a flue gas by supplying a boundary layer of gas along the sides of the housing to prevent deposition of wet material on the sidewalls.

Another object is to provide an improved method for spraying a liquid into a flue gas.

Still another object of the present invention is to provide an improved high efficiency advanced dry scrubber which is simple in design, rugged in construction, and economical to manufacture.

The various features of novelty characterized in the present invention are pointed out with particularity in the claims annexed to and forming a part of this disclosure. For a better understanding of the invention, and the operating advantages attained by its uses, reference is made to the accompanying drawings and descriptive matter in which the preferred embodiment of the invention is illustrated.

BRIEF DESCRIPTION OF THE DRAWINGS

In the drawings:

FIG. 1A is a schematic representation of a dry scrubbing reactor in accordance with the present invention illustrating the boundary layer slip stream gas reheat device flow schematic;

FIG. 2 is a schematic representation of a dry scrubbing reactor in accordance with the present invention illustrating an alternate boundary layer slip stream flow schematic;

DESCRIPTION OF THE PREFERRED EMBODIMENTS

Figure 1B:
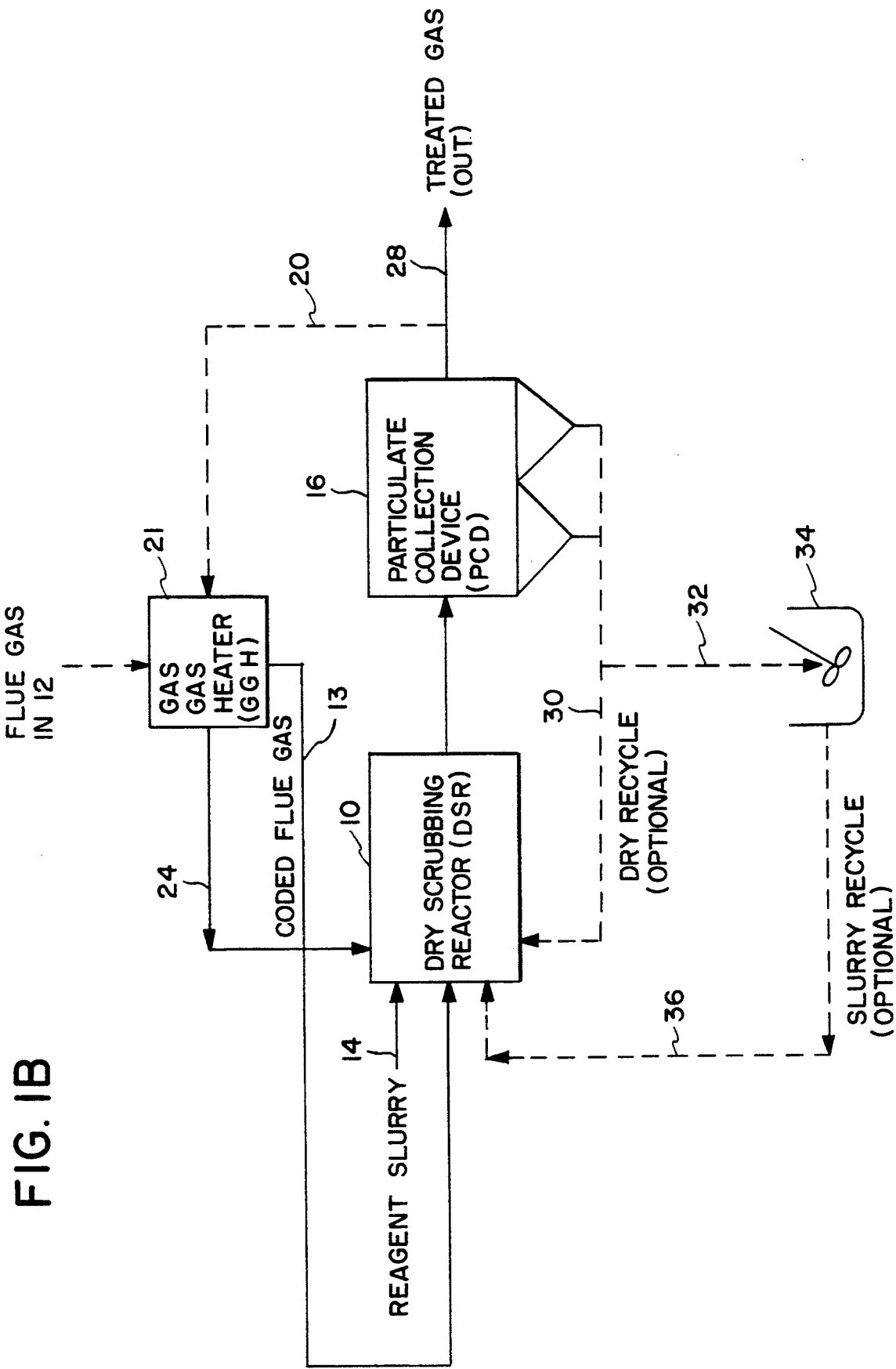
FIG. 1B is a schematic representation of a dry scrubbing reactor similar to FIG. 1A except showing the flue gas entering the gas gas heater (21) prior to entering the dry scrubber (10)

The present invention resides in a high efficiency advanced dry scrubber (HEADS). The purpose of the invention is to advance the existing dry scrubbing technology by increasing both sulfur oxide/contaminant removal efficiencies and reagent utilization to approach those achievable by wet scrubbing, by reducing spray down temperatures to at/or near saturation while still producing a dry product.

Referring to the figures, where like numerals designate like or similar features throughout the several views, the present invention employs a dry scrubbing reactor 10 which may consist of a vertical or horizontal co-current flow dry scrubber equipped with a single or multiple array of atomizers (i.e., mechanical dual fluid, or rotary type) that produces a homogeneous distribution of a finely atomized liquid such as an alkaline slurry in the flue gas stream. As is known in this art, the dry scrubber is connected by a duct to a combustion source (not shown) which produces flue gas that passes along the duct (not shown) into the dry scrubber 10 at 12. A liquid or slurry is atomized into the dry scrubber reactor 10 at 14 as previously described. The dry scrubbing reactor 10 is located immediately upstream of a particulate collection device (PCD) 16. A slip stream of dust laden flue gas 18 or particulate free flue gas 20 is taken from the duct immediately upstream or downstream, respectively, of the particulate collection device 16 and sent to a gas reheat device 22 prior to injection through conduit 24 into the dry scrubbing reactor 10. In lieu of the flue gas, air 26 may be supplied from a source (not shown) to the gas reheat device 22 where it is heated and injected as a boundary layer.

Referring to FIG. 1B, the available heat from the incoming flue gas 12 is used to heat particulate free gas 20 using gas-gas heater 21. The slightly cooled flue gas 13 is then sent to dry scrubber reactor 10. A gas-gas heater could be used for arrangements shown in FIGS. 2 and 3 as the gas reheat device to minimize the need for an external heat source such as a steam coil heat exchanger, combustion type gas reheat device, or any of a number of known gas reheating devices.

An alternate embodiment is to eliminate the gas reheat device 22 and supply heated air directly to the dry scrubbing reactor 10. The treated flue gas exits the particulate collection device 16 and the system through duct 28 where it is discharged through a stack.

To further increase removal efficiencies and reagent utilization, fly ash material collected from the particulate device 16 is recycled back to the dry scrubbing reactor 10 either dry via duct 30 or wet (slurried) from duct 32 to a slurring means 34 where it is then pumped through duct 36 into the dry scrubbing reactor 10. Alternatively, simultaneous wet and dry recycle could be used.

The present invention enables a controlled spray down temperature to at/or near saturation. Because the system is operated at/or near the saturation temperature this increases removal efficiency and reagent utilization.

Figure 4A:
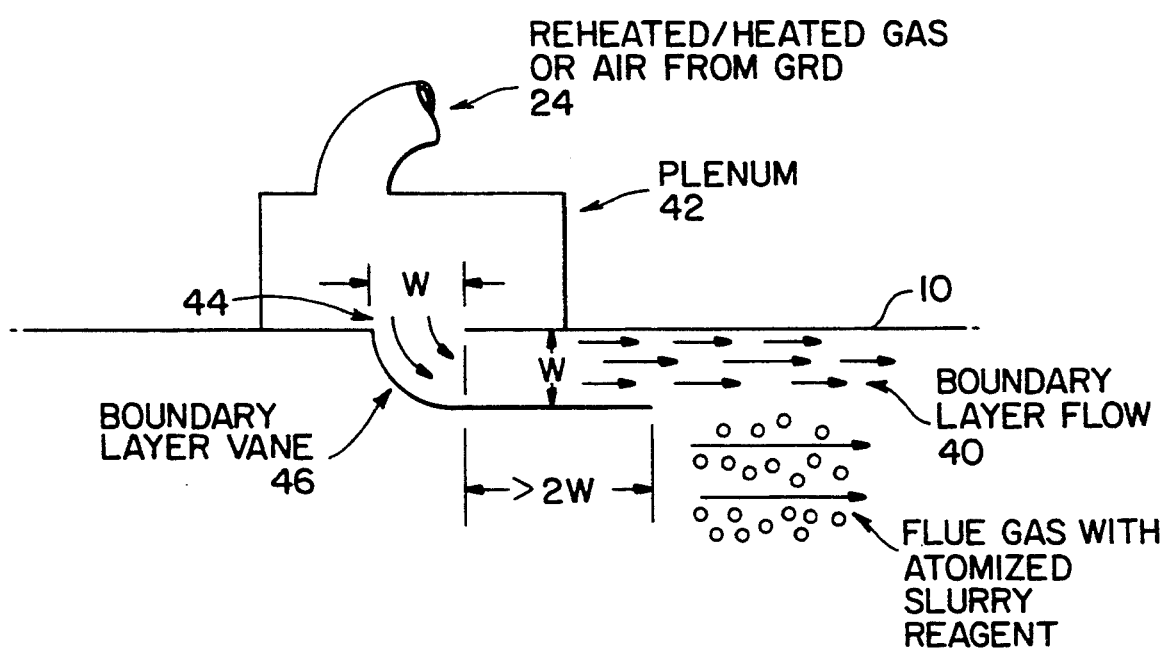
FIG. 4A is a partial cross-sectional view of one embodiment of the dry scrubber reactor showing the manner of establishing the boundary layer.

Next, referring to FIG. 4A, there is shown one method for introducing the boundary layer of gas 40 into the dry scrubber 10 by at least one point but preferably a plurality of points around the perimeter of the dry scrubbing reactor housing 10. The boundary layer of gas 40 prevents the deposition of wet materials along the sidewalls of the dry scrubber reactor housing 10. This is the major reason for limiting the spraydown temperature i.e., the approach to saturation, of current design dry scrubbers. FIG. 4A shows the duct or conduit 24 attached to a cover 42 which defines a cavity or plenum over the aperture or opening 44 in the sidewall of the dry scrubber reactor housing 10. Preferably, there are a plurality of openings 44 each having a diameter w if circular or depth w for a rectangular opening 44 with a boundary layer vane 46 for each aperture 44 which includes a curved or streamlined portion positioned into the flow of the flue gas as seen in FIG. 4A. The boundary layer vanes 46 direct the heated boundary layer gas flow on the inside surface and allow it to flow parallel with the sidewalls of the dry scrubber 10. The boundary layer vane 46 is positioned a distance w from the sidewall of the dry scrubber reactor housing 10 and extends a length of greater than 2W substantially parallel to the sidewall. Depending upon the length of the dry scrubbing reactor housing 10, it may be necessary to use a plurality of these arrangements to prevent deposition of wet material on the inside walls. These arrangements can be employed either horizontally, vertically, or both to provide a heated flow of boundary layer gas throughout the inside surface for a desired width and length of the dry scrubbing reactor. As an alternate embodiment to that shown in FIG. 4A, pipe sections with 90 degree elbows are used instead of the curved vane 46.

Figure 4B:
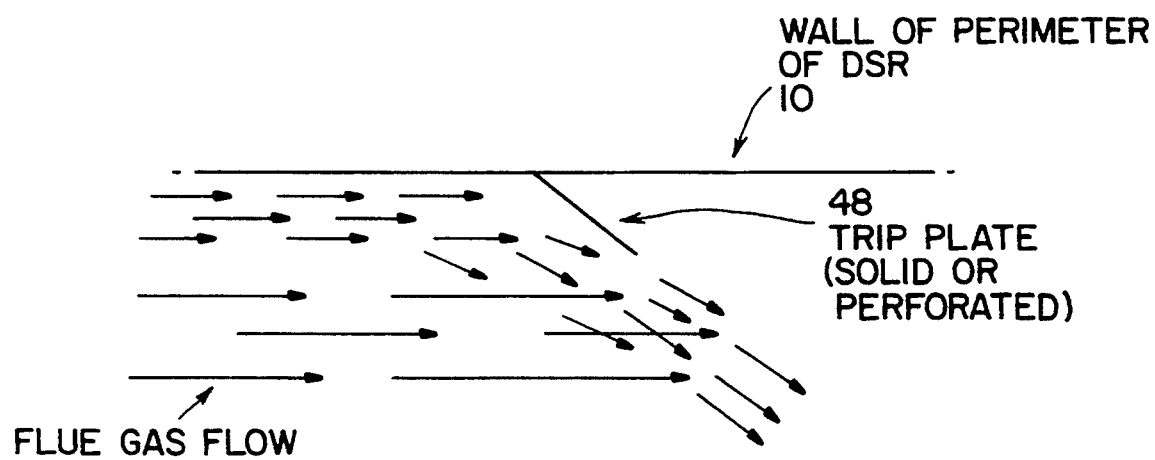
FIG. 4B is a partial cross-sectional view of the mixing means in dry scrubber reactor in accordance with the present invention.

FIG. 4B shows one method for mixing the heated boundary layer flow 40 with the main flue gas stream. A trip plate 48 which may be either solid or perforated directs the flow 40 from the wall into the main flue gas stream to mix it. To completely mix the boundary layer flow 40 with the main flue gas stream, several trip plates 48 are positioned along the length of the dry scrubbing reactor housing 10. To avoid the boundary layer gas from separating and moving off of the inside wall of the dry scrubbing reactor housing 10, as can occur when the flow is expanded to a larger flow area, boundary layer attachment and control techniques, such as suction or use of metal tabs as vortex generators may be employed in a known fashion.

Referring back to FIG. 2, there is shown a dry scrubbing reactor 10 located immediately upstream of the gas reheat device 22 which is positioned immediately upstream of the particulate collection device 16. The boundary layer of gas is taken from either line 18 for a heated dust laden gas or line 20 for a particulate free reheated gas for injection into the dry scrubbing reactor 10. This embodiment is similar to that shown in FIG. 1A except that the gas reheat device 22 is now in line in the system.

Figure 3:
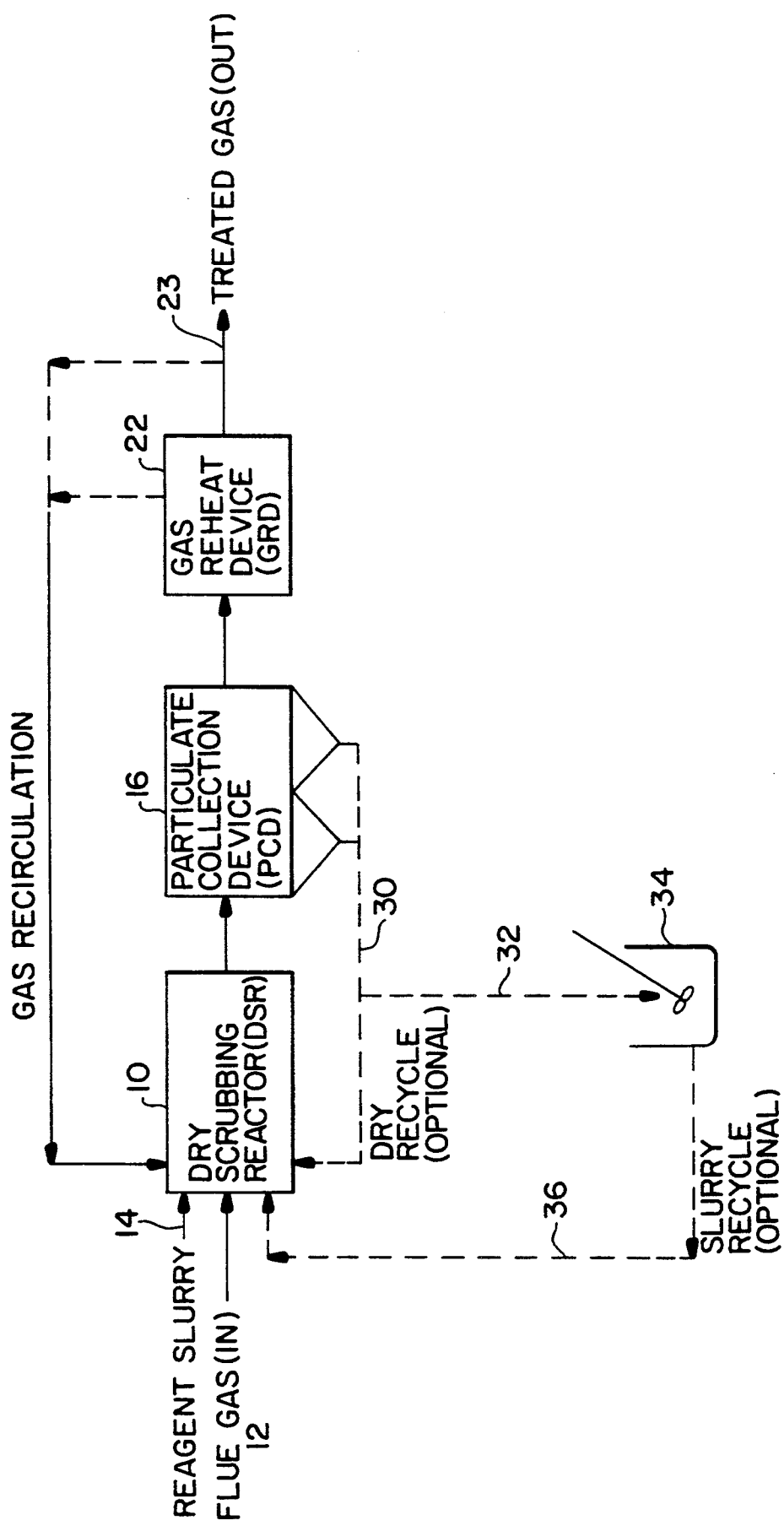
FIG. 3 is a schematic representation showing still another boundary layer slip stream flow schematic.

FIG. 3 shows yet another embodiment of the present invention with the gas reheat device 22 situated downstream from the particulate collection device 16. The particulate collection device 16 is positioned immediately downstream from the dry scrubbing reactor 10. In this embodiment the slip stream of particulate free reheated gas is taken either directly from the gas reheat device 22 or immediately downstream of the gas reheat device 22 by way of duct 23 for boundary layer injection into the dry scrubbing reactor 10.

The present invention as stated earlier operates at/or near the saturation temperature to further increase removal efficiencies and reagent utilization. The boundary layer of reheated/heated gas or air is introduced at a point or points around the perimeter of the sidewalls of the dry scrubbing reactor housing to prevent the deposition of wet materials on the sidewalls. The hot gas boundary layer is then re-entrained/mixed into the bulk process gas (saturated) to complete the dry scrubbing process. Thus, a dry reaction product leaves the dry scrubber, and it insures an exit temperature suitable to protect and maintain operation of the downstream equipment.

Figure 5:
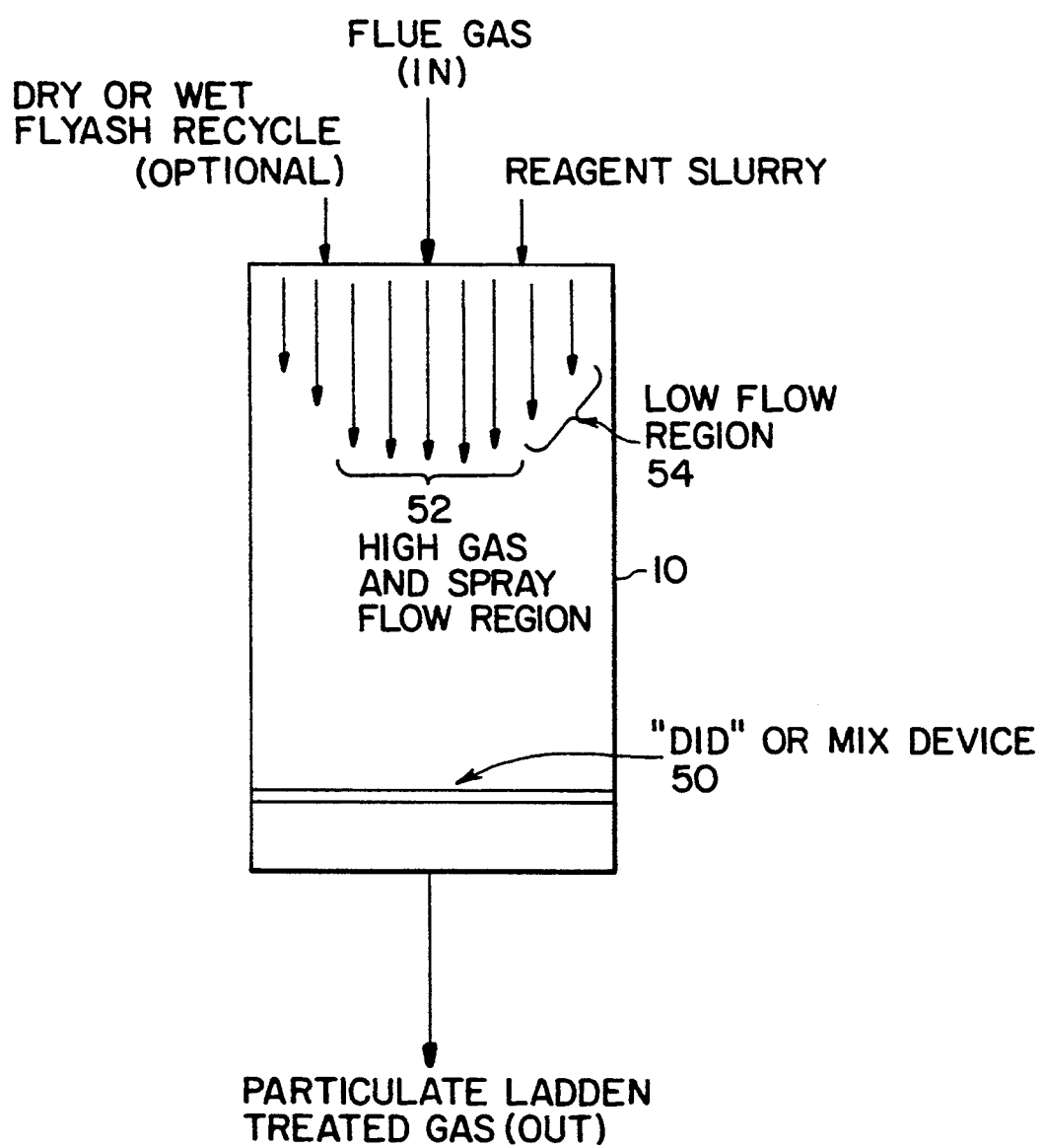
FIG. 5 is a sectional representation of still another embodiment of the dry scrubber in accordance with the present invention.

FIG. 5 shows still another embodiment of the present invention where a droplet impingement device is installed at the outlet of the dry scrubber 10 in lieu of the gas reheat device 22, or in addition thereto. The droplet impingement device 50 is described in U.S. Pat. No. 4,888,158.

The present invention provides several advantages over the prior art devices including but not limited to the following:

1. The ability to obtain sulfur oxide and other contaminant removal efficiencies near or equal to those achievable by wet scrubbing while minimizing the loss of liquid to the atmosphere and eliminating the need for costly primary and secondary de-watering and waste water treatment systems.
2. Reagent utilization is maximized when compared against that achievable by the prior art dry scrubbing processes. Through the use of wet or dry recycle, reagent utilization approaches that achievable with wet scrubbing.
3. Lower capital expense and operating cost are realized when compared to wet scrubbing and other processes capable of achieving equivalent removal efficiencies and reagent utilization.
4. The possibility of boiler upsets no longer restricts, i.e., limit the approach to saturation, dry scrubber spray down temperatures.
5. Specialized equipment and/or materials of construction are not required for handling wet reaction products including sludge and/or saturated exhaust gases.

While specific embodiments of the invention have been shown and described in detail to illustrate the applications and principles of the invention, certain modifications and improvements will occur to those skilled in the art upon reading the foregoing description. It is thus understood that all such modifications and improvements have been deleted herein for the sake of conciseness and readability, but are properly within the scope of the following claims. One example of such a modification is to direct the flow in the dry scrubber reactor 10 as shown in FIG. 5 for high and low flow regions, 52, 54, respectively. The high flow region 52 is saturated with a high spray flow. The low flow region 54 has a corresponding low slurry flow or no slurry flow at all to provide the hot or nonsaturated boundary layer. This process is followed with a droplet impingement device 50 or some other mixing arrangement. Also, FIG. 5 illustrates the downflow arrangement for the dry scrubber 10 as opposed to a horizontal arrangement or upflow arrangement.

What is claimed is:

1. An improved method for spraying a liquid in a flue gas, comprising the steps of:
providing a housing with an inlet and an outlet in a duct supplying a flue gas stream;
positioning at least one atomizer in the housing for spraying a liquid into the flue gas passing therethrough to condition it; and
supplying a boundary layer of gas along a perimeter of the housing for preventing deposition of wet material on sidewalls of the housing.

2. An improved method as recited in claim 1, further comprising the step of mixing the boundary layer of gas with the conditioned flue gas.

3. An improved method as recited in claim 2, wherein the mixing step includes positioning a plurality of trip plates to the sidewalls of the housing to extend into the flue gas stream and direct the flow from the sidewalls into the flue gas stream.

4. An improved method as recited in claim 1, wherein said boundary layer of gas is a member selected from the group consisting of air, particulate free flue gas, and dust laden flue 5. An improved method as recited in claim 1, wherein said supplying step further includes the steps of:
supplying a gas to a chamber situated outside the housing; and
directing the gas through at least one opening in the sidewall of the housing with at least one vane attached thereto for supplying the boundary layer of gas.

6. An improved method as recited in claim 5, further comprising the step of providing a streamlined portion to each vane with the streamlined portion being upstream of each opening in the sidewall.

7. An improved apparatus for spraying a liquid into a flue gas, comprising:
a housing with an inlet for receiving the flue gas and an outlet for discharging the flue gas, said inlet of said housing being connected to a duct supplying a flue gas stream;
a liquid source connected to at least one atomizer, said at least one atomizer positioned inside said housing for spraying a liquid from said liquid source into the flue gas stream for conditioning the flue gas;
and means for supplying from a gas source connected to said supplying means a boundary layer of gas along sidewalls of said housing for preventing deposition of wet material thereon.

8. An improved apparatus as recited in claim 7, further comprising means for mixing the boundary layer of gas with the conditioned flue gas inside said housing.

9. An improved apparatus as recited in claim 8, wherein said mixing means comprises a plurality of trip plates attached to sidewalls of the housing and extending into the flue gas stream for directing the flow from the sidewalls into the flue gas stream.

10. An improved apparatus as recited in claim 9, wherein said trip plates are solid.

11. An improved apparatus as recited in claim 9, wherein said trip plates are perforated.

12. An improved apparatus as recited in claim 7, wherein said boundary layer of gas is a member selected from the group consisting of air, particulate free flue gas, and dust laden flue gas.

13. An improved apparatus as recited in claim 12, further comprising means for heating said boundary layer.

14. An improved apparatus as recited in claim 7, wherein said means for supplying a boundary layer of gas comprises:
- at least one vane positioned inside said housing over an opening in the sidewall for directing the boundary layer of gas along the sidewall of said housing; and
- at least one conduit connected to a supply of gas for injecting gas through the opening in the sidewall of said housing.

15. An improved apparatus as recited in claim 14, wherein each vane includes a streamlined portion upstream of the opening in the sidewall, and each vane being spaced a distance W from the sidewall with a length greater than 2W.

16. An improved apparatus as recited in claim 14 wherein each conduit is connected at one end to a cover which defines a plenum surrounding the opening in the sidewalls of said housing.

17. An improved apparatus as recited in claim 7, further comprising means for heating said boundary layer.

* * * * *